United States Patent
Sasaki et al.

(10) Patent No.: US 9,712,694 B2
(45) Date of Patent: Jul. 18, 2017

(54) COOPERATIVE SYSTEM, INFORMATION PROCESSING APPARATUS, AND COMPUTER PROGRAM PRODUCT

(71) Applicants: Tohru Sasaki, Kanagawa (JP); Hirohisa Saitoh, Tokyo (JP); Mie Watanabe, Tokyo (JP); Shunsuke Watanabe, Tokyo (JP); Yuka Konno, Kanagawa (JP); Takashi Toriumi, Kanagawa (JP); Yasunori Tsukioka, Kanagawa (JP); Katsumi Tanaka, Kanagawa (JP); Hiroyuki Sakuyama, Tokyo (JP); Atsushi Okazato, Kanagawa (JP); Koichiro Maemura, Kanagawa (JP); Yukinori Ishii, Kanagawa (JP); Tomohiro Kuroyanagi, Tokyo (JP); Fumiyoshi Kittaka, Kanagawa (JP); Makoto Sasaki, Kanagawa (JP); Junki Aoki, Kanagawa (JP); Takuya Mori, Tokyo (JP)

(72) Inventors: Tohru Sasaki, Kanagawa (JP); Hirohisa Saitoh, Tokyo (JP); Mie Watanabe, Tokyo (JP); Shunsuke Watanabe, Tokyo (JP); Yuka Konno, Kanagawa (JP); Takashi Toriumi, Kanagawa (JP); Yasunori Tsukioka, Kanagawa (JP); Katsumi Tanaka, Kanagawa (JP); Hiroyuki Sakuyama, Tokyo (JP); Atsushi Okazato, Kanagawa (JP); Koichiro Maemura, Kanagawa (JP); Yukinori Ishii, Kanagawa (JP); Tomohiro Kuroyanagi, Tokyo (JP); Fumiyoshi Kittaka, Kanagawa (JP); Makoto Sasaki, Kanagawa (JP); Junki Aoki, Kanagawa (JP); Takuya Mori, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/061,672

(22) Filed: Mar. 4, 2016

(65) Prior Publication Data
US 2016/0274824 A1 Sep. 22, 2016

(30) Foreign Application Priority Data
Mar. 20, 2015 (JP) ................................. 2015-058768

(51) Int. Cl.
*G06F 15/00* (2006.01)
*H04N 1/00* (2006.01)

(52) U.S. Cl.
CPC ..... *H04N 1/00347* (2013.01); *H04N 1/00344* (2013.01); *H04N 2201/0013* (2013.01); *H04N 2201/0074* (2013.01); *H04N 2201/0094* (2013.01)

(58) Field of Classification Search
USPC ....................................................... 358/1.15
See application file for complete search history.

(56) References Cited

U.S. PATENT DOCUMENTS

2005/0248584 A1 11/2005 Takeo et al.
2005/0254085 A1 11/2005 Oshikiri et al.
(Continued)

FOREIGN PATENT DOCUMENTS

JP 5241345 4/2013

*Primary Examiner* — Saeid Ebrahimi Dehkord
(74) *Attorney, Agent, or Firm* — Harness, Dickey & Pierce, P.L.C.

(57) ABSTRACT

An operation unit in a child device causes a main unit in the child device to execute a stand-alone job, and causes the main unit and a server device to execute a cooperating job. The main unit executes the stand-alone job every time it is requested, and generates and manages a stand-alone job log including stand-alone job log identification information. The
(Continued)

server device controls the execution of stand-alone jobs included in the cooperating job based on a request for executing the cooperating job, and manages cooperating job identification information associated with the stand-alone job log identification information of the stand-alone jobs included in the cooperating job. The server device acquires the stand-alone job logs from the main unit and extracts the stand-alone job logs including the stand-alone job log identification information associated with the cooperating job identification information, to generate a cooperating job log corresponding to the cooperating job.

18 Claims, 19 Drawing Sheets

(56) References Cited

U.S. PATENT DOCUMENTS

| | | |
|---|---|---|
| 2006/0114918 A1 | 6/2006 | Ikeda et al. |
| 2006/0227143 A1 | 10/2006 | Maita et al. |
| 2008/0212136 A1* | 9/2008 | Namikata ............ G06F 3/1288 358/1.16 |
| 2009/0300529 A1 | 12/2009 | Endoh et al. |
| 2010/0005167 A1 | 1/2010 | Kishimoto |
| 2012/0144329 A1 | 6/2012 | Sasaki |
| 2013/0329253 A1 | 12/2013 | Sasaki |
| 2015/0271353 A1 | 9/2015 | Nishimura et al. |
| 2015/0293728 A1 | 10/2015 | Nishimura et al. |
| 2015/0341441 A1 | 11/2015 | Saitoh et al. |

* cited by examiner

FIG.11

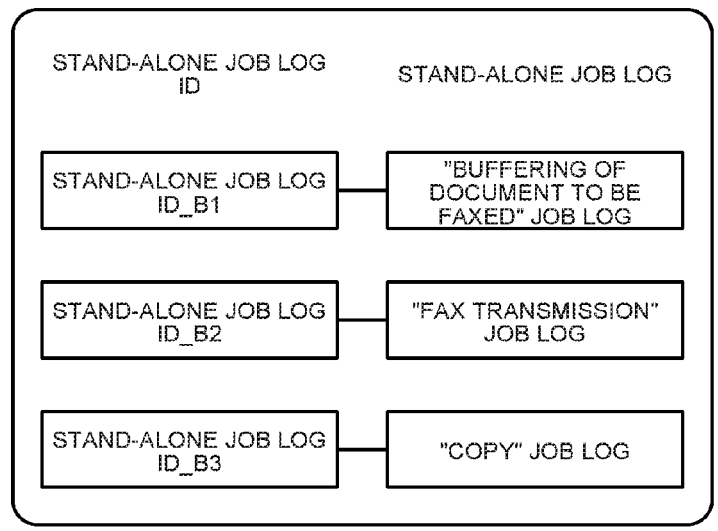

FIG.12

| LOG LOCATION | LOG TYPE | SOURCE | DESTINATION |
|---|---|---|---|
| DEVICE IDENTIFICATION INFORMATION_A | "SCANNING AND BUFFERING" | SCANNER | BUFFER MEMORY |
| DEVICE IDENTIFICATION INFORMATION_A | "ACQUISITION OF SCANNED AND BUFFERED IMAGE" | BUFFER MEMORY | NETWORK |
| DEVICE IDENTIFICATION INFORMATION_B | "BUFFERING OF DOCUMENT TO BE FAXED" | NETWORK | BUFFER MEMORY |
| DEVICE IDENTIFICATION INFORMATION_B | "FAX TRANSMISSION" | BUFFER MEMORY | NETWORK |

FIG.13

| CLASSIFICATION | | ITEMS | VALUE |
|---|---|---|---|
| COMMON | | JOB LOG ID | (NUMERIC VALUE) |
| | | START TIME | DD/MM/YYYY, hh:mm:ss |
| | | END TIME | DD/MM/YYYY, hh:mm:ss |
| | | OPERATION SOURCE | OPERATION UNIT/DRIVER |
| | | USER NAME | (CHARACTER STRING) |
| SOURCE | SCANNER | STATUS/RESULT | ENDED NORMALLY/ ENDED ABNORMALLY |
| | | NUMBER OF ORIGINAL SURFACES SCANNED | (NUMERIC VALUE) |
| | | COLOR MODE | MONOCHROMATIC FULL-COLOR |
| | | ORIGINAL TYPE | TEXTS/ TEXTS & PHOTOGRAPHS/ PHOTOGRAPHS/ GRAY SCALE |
| | | RESOLUTION | (NUMERIC VALUE) |
| DESTINATION | BUFFER MEMORY | STATUS/RESULT | ENDED NORMALLY/ ENDED ABNORMALLY |
| | | NUMBER OF SHEETS BUFFERED | (NUMERIC VALUE) |
| | | DOCUMENT NAME | (CHARACTER STRING) |
| | | DOCUMENT ID | (NUMERIC VALUE) |

FIG.14

| CLASSIFICATION | | ITEMS | VALUE |
|---|---|---|---|
| COMMON | | JOB LOG ID | (NUMERIC VALUE) |
| | | START TIME | DD/MM/YYYY, hh:mm:ss |
| | | END TIME | DD/MM/YYYY, hh:mm:ss |
| | | OPERATION SOURCE | PC UTILITY/WEB |
| | | USER NAME | (CHARACTER STRING) |
| SOURCE | BUFFER MEMORY | STATUS/RESULT | ENDED NORMALLY/ ENDED ABNORMALLY |
| | | NUMBER OF SHEETS BUFFERED | (NUMERIC VALUE) |
| | | DOCUMENT NAME | (CHARACTER STRING) |
| | | DOCUMENT ID | (NUMERIC VALUE) |
| DESTINATION | NETWORK | STATUS/RESULT | ENDED NORMALLY/ ENDED ABNORMALLY |
| | | TRANSMISSION TYPE | FTP/HTTP |
| | | SHEETS TRANSMITTED | (NUMERIC VALUE) |

FIG.15

| CLASSIFICATION | | ITEMS | VALUE |
|---|---|---|---|
| COMMON | | JOB LOG ID | (NUMERIC VALUE) |
| | | START TIME | DD/MM/YYYY, hh:mm:ss |
| | | END TIME | DD/MM/YYYY, hh:mm:ss |
| | | OPERATION SOURCE | OPERATION UNIT/DRIVER |
| | | USER NAME | (CHARACTER STRING) |
| SOURCE | NETWORK | STATUS/RESULT | ENDED NORMALLY/ ENDED ABNORMALLY |
| | | TRANSMISSION TYPE | FTP/HTTP |
| | | SHEETS TRANSMITTED | (NUMERIC VALUE) |
| DESTINATION | BUFFER MEMORY | STATUS/RESULT | ENDED NORMALLY/ ENDED ABNORMALLY |
| | | NUMBER OF SHEETS BUFFERED | (NUMERIC VALUE) |
| | | DOCUMENT NAME | (CHARACTER STRING) |
| | | DOCUMENT ID | (NUMERIC VALUE) |

FIG. 16

| CLASSIFICATION | | ITEMS | VALUE |
|---|---|---|---|
| COMMON | | JOB LOG ID | (NUMERIC VALUE) |
| | | START TIME | DD/MM/YYYY, hh:mm:ss |
| | | END TIME | DD/MM/YYYY, hh:mm:ss |
| | | OPERATION SOURCE | PC UTILITY/WEB |
| | | USER NAME | (CHARACTER STRING) |
| SOURCE | BUFFER MEMORY | STATUS/RESULT | ENDED NORMALLY/ ENDED ABNORMALLY |
| | | NUMBER OF SHEETS BUFFERED | (NUMERIC VALUE) |
| | | DOCUMENT NAME | (CHARACTER STRING) |
| | | DOCUMENT ID | (NUMERIC VALUE) |
| DESTINATION | NETWORK | STATUS/RESULT | ENDED NORMALLY/ ENDED ABNORMALLY |
| | | RECEIVER | (CHARACTER STRING) |
| | | TRANSMITTER | (CHARACTER STRING) |
| | | TRANSMISSION TYPE | G3/G4/FTP/SMB/MAIL |
| | | SHEETS TRANSMITTED | (NUMERIC VALUE) |

FIG.21

| JOB LOG ACQUIRING CONDITION SETTING |
|---|

SET CONDITIONS FOR ACQUIRING JOB LOG AND CLICK [APPLY]

| SELECT FROM JOB LOG STRUCTURE |
|---|

APPLY

SELECT JOB LOGS TO BE ACQUIRED

| JOB LOG ID | DEVICE | LOG TYPE | |
|---|---|---|---|
| JOB LOG ID_X1 | IMAGE FORMING APPARATUS A | "SCANNIG AND BUFFERING" | ☑ |
| | | "ACQUISITION OF SCANNED AND BUFFERED IMAGE" | ☐ |
| | IMAGE FORMING APPARATUS B | "BUFFERING OF DOCUMENT TO BE FAXED" | ☑ |
| | | "FAX TRANSMISSION" | ☐ |
| JOB LOG ID_A3 | IMAGE FORMING APPARATUS A | "SCANNING AND TRANSMISSION" | ☐ |
| JOB LOG ID_B3 | IMAGE FORMING APPARATUS B | "COPY" | ☐ |

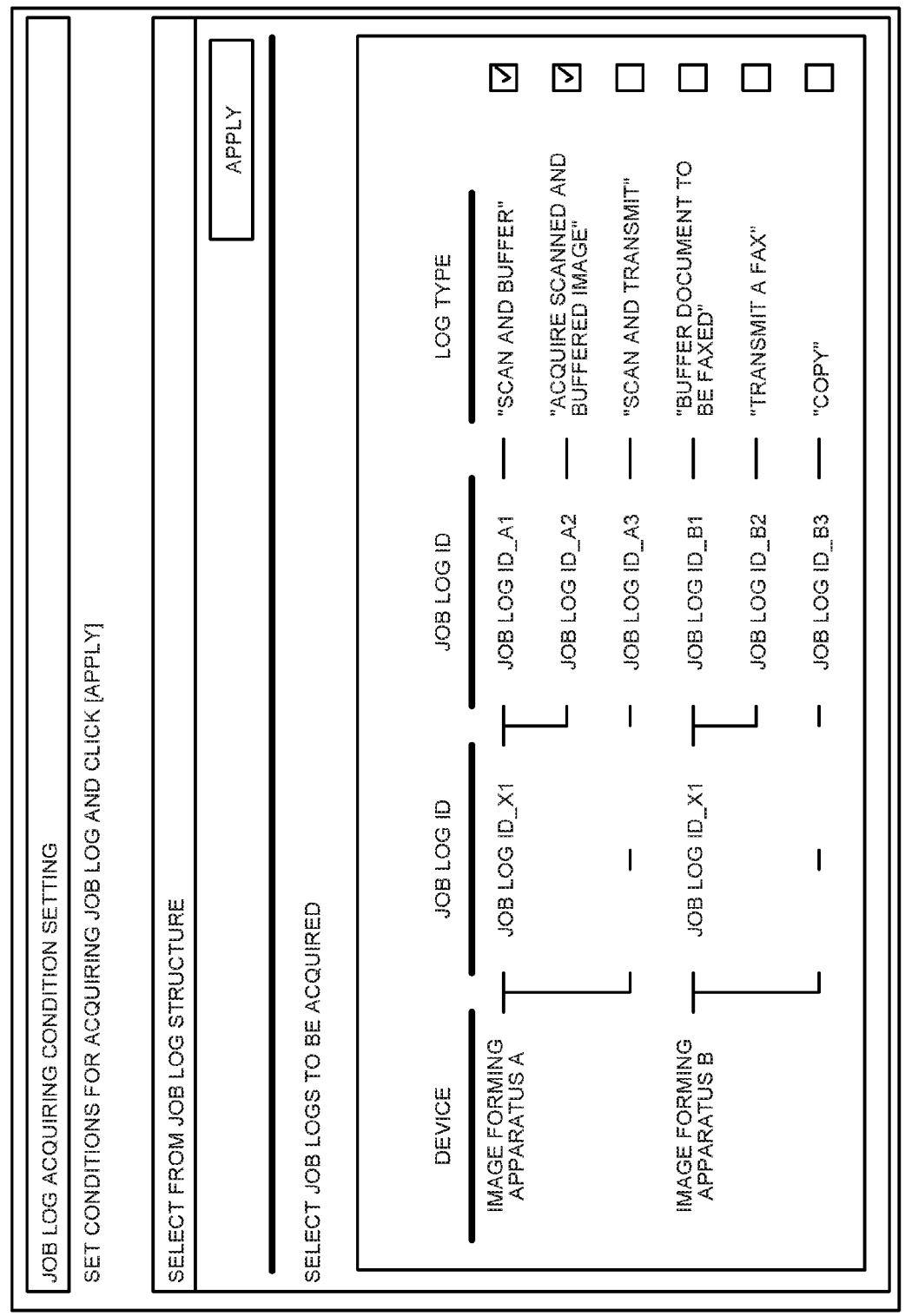

COOPERATIVE SYSTEM, INFORMATION PROCESSING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2015-058768 filed in Japan on Mar. 20, 2015.

BACKGROUND OF THE INVENTION

1. Field of the Invention

The present invention relates to a cooperative system, an information processing apparatus, and a computer program product.

2. Description of the Related Art

Conventionally known are technologies for enabling a plurality of image forming apparatuses to operate cooperatively to achieve functions that cannot be achieved merely with one image forming apparatus.

Among such technologies, for example, Japanese Patent No. 5241345 discloses a technology for managing jobs corresponding to a cooperative operation. According to this disclosure, the logs of jobs executed by the image forming apparatuses are gathered and associated with each other so as to manage jobs for a cooperative operation. With the technology disclosed in Japanese Patent No. 5241345, because one of the image forming apparatuses controls the cooperative operation, the image forming apparatus serving as the controller of the cooperative operation can gather the jobs executed by the image forming apparatuses.

Also having been developed recently are devices having an independent operation unit and an independent main unit, but the main unit in such a device does not control the flow of a job.

Therefore, when such a device is caused to perform a cooperative operation, the main unit of the device has been only capable of managing the log of the jobs executed by the device, and been incapable of gathering and managing the logs of jobs executed by another device, in the manner disclosed in Japanese Patent No. 5241345. Therefore, the jobs of a cooperative operation have not been quite manageable.

Therefore, there is a need for a cooperative system, an information processing apparatus, and a computer program product that enable the management of jobs for a cooperative operation even when an apparatus having an independent operation unit and an independent main unit performs the cooperative operation.

SUMMARY OF THE INVENTION

It is an object of the present invention to at least partially solve the problems in the conventional technology.

According to an embodiment, a cooperative system includes a device that includes an operation unit and a main unit capable of establishing communication; and an information processing apparatus. The operation unit includes a job controlling unit configured to cause the main unit to execute a stand-alone job, and cause the main unit and the information processing apparatus to execute a cooperating job including a plurality of stand-alone jobs. The main unit includes job executing unit and a stand-alone job log managing unit. Every time execution of a stand-alone job is requested by at least one of the operation unit and the information processing apparatus, the job executing unit executes the stand-alone job. The stand-alone job log managing unit generates and manages, for each executed stand-alone job, a stand-alone job log that is a log of the stand-alone job and that includes stand-alone job log identification information for identifying the log. The information processing apparatus includes a job execution controlling unit and a cooperating job log managing unit. The job execution controlling unit controls execution of the stand-alone jobs included in the cooperating job, based on a request for executing the cooperating job from the operation unit. The cooperating job log managing unit manages cooperating job identification information for identifying the cooperating job in an association manner with stand-alone job log identification information of the stand-alone jobs included in the cooperating job. The cooperating job log managing unit acquires stand-alone job logs from the main unit and extracts the stand-alone job logs including the stand-alone job log identification information associated with the cooperating job identification information, so as to generate a cooperating job log that is a log of the cooperating job.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a schematic of an example of information related to logs managed by the main unit according to the embodiment;

FIG. 12 is a schematic generally illustrating logs of stand-alone jobs included in a cooperating job for device cooperating facsimile transmission according to the embodiment;

FIG. 13 is a schematic illustrating an example of the job log "scanning and buffering" illustrated in FIG. 12 in detail;

FIG. 14 is a schematic illustrating an example of an job log "acquisition of scanned and buffered image" illustrated in FIG. 12 in detail;

FIG. 15 is a schematic illustrating an example of the job log of "buffering document to be faxed" illustrated in FIG. 12 in detail;

FIG. 16 is a schematic illustrating an example of the job log of "FAX transmission" illustrated in FIG. 12 in detail;

FIG. 21 is a schematic of an exemplary structure tree of the stand-alone job logs according to the embodiment; and FIG. 22 is a schematic of an exemplary structure tree of the stand-alone job logs according to the embodiment.

DETAILED DESCRIPTION OF THE PREFERRED EMBODIMENTS

An embodiment will now be explained in detail with reference to the appended drawings. Explained below is an example in which a cooperative operation is a device cooperating facsimile transmission. In the device cooperating facsimile transmission, a device having no facsimile function operates cooperatively with another device having a facsimile function, and the facsimile function is implemented by the device having no facsimile function. The cooperative operation is, however, not limited to the device cooperating facsimile transmission. The cooperative operation may be, for example, device cooperating copying in which a device having no printing function operates cooperatively with a device having no scanner function to implement a copier function.

Figure 1:
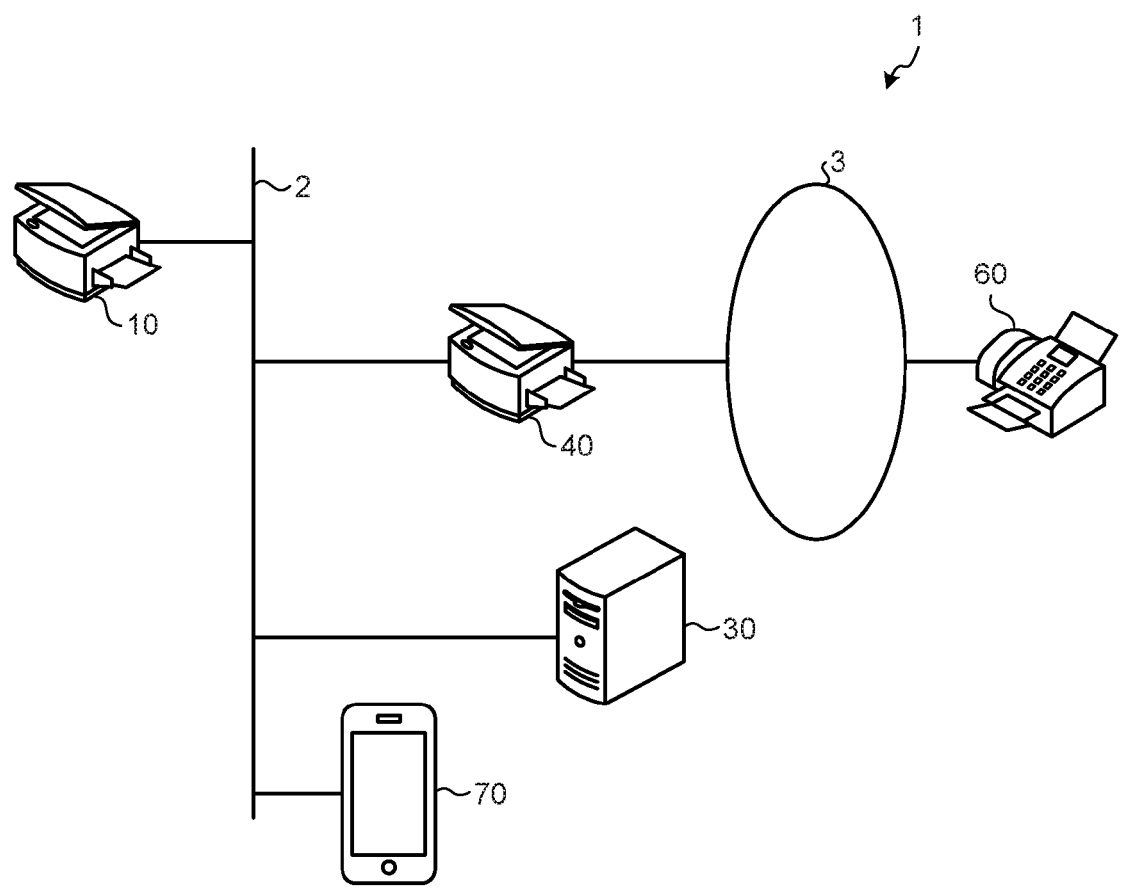
FIG. 1 is a schematic illustrating an exemplary configuration of a cooperative system according to an embodiment of the present invention.

FIG. 1 is a schematic illustrating an exemplary configuration of a cooperative system 1 according to the embodiment. As illustrated in FIG. 1, the cooperative system 1 includes a child device 10, a server device 30 (an example of the information processing apparatus), a parent device 40, an external facsimile device 60, and a terminal device 70. The child device 10, the server device 30, the parent device 40, and the terminal device 70 are connected over an internal network 2, and the parent device 40 and the external facsimile device 60 are connected over an external network 3.

The internal network 2 is a private network, and is a local area network (LAN), for example. The external network 3 is a public network, and is a public circuit network or the Internet, for example. Explained in the embodiment is an example in which the external network 3 is a public circuit network, but the embodiment is not limited thereto.

The child device 10 is a device that is connected to the internal network 2 to which the parent device 40 is connected, and is a device having no facsimile function. The child device 10 is, for example, an image forming apparatus such as a printer, a copier, or a multifunction peripheral (MFP).

The parent device 40 is a device that is connected to the internal network 2 and the external network 3, and is a device having a facsimile function. The parent device 40 is, for example, a FAX machine, a telephone with a facsimile function, or an MPF with a facsimile function.

The server device 30 is a server for implementing the device cooperating facsimile transmission by transferring facsimile image data generated by the child device 10 to the parent device 40 and causing the parent device 40 to transmit a FAX of the image data to the external facsimile device 60, or by transferring facsimile image data transmitted from the external facsimile device 60 and received by the parent device 40 to the child device 10.

The terminal device 70 is a terminal device carried by a user, and an example of the terminal device 70 includes a smart device such as a smartphone and a tablet terminal.

Figure 2:
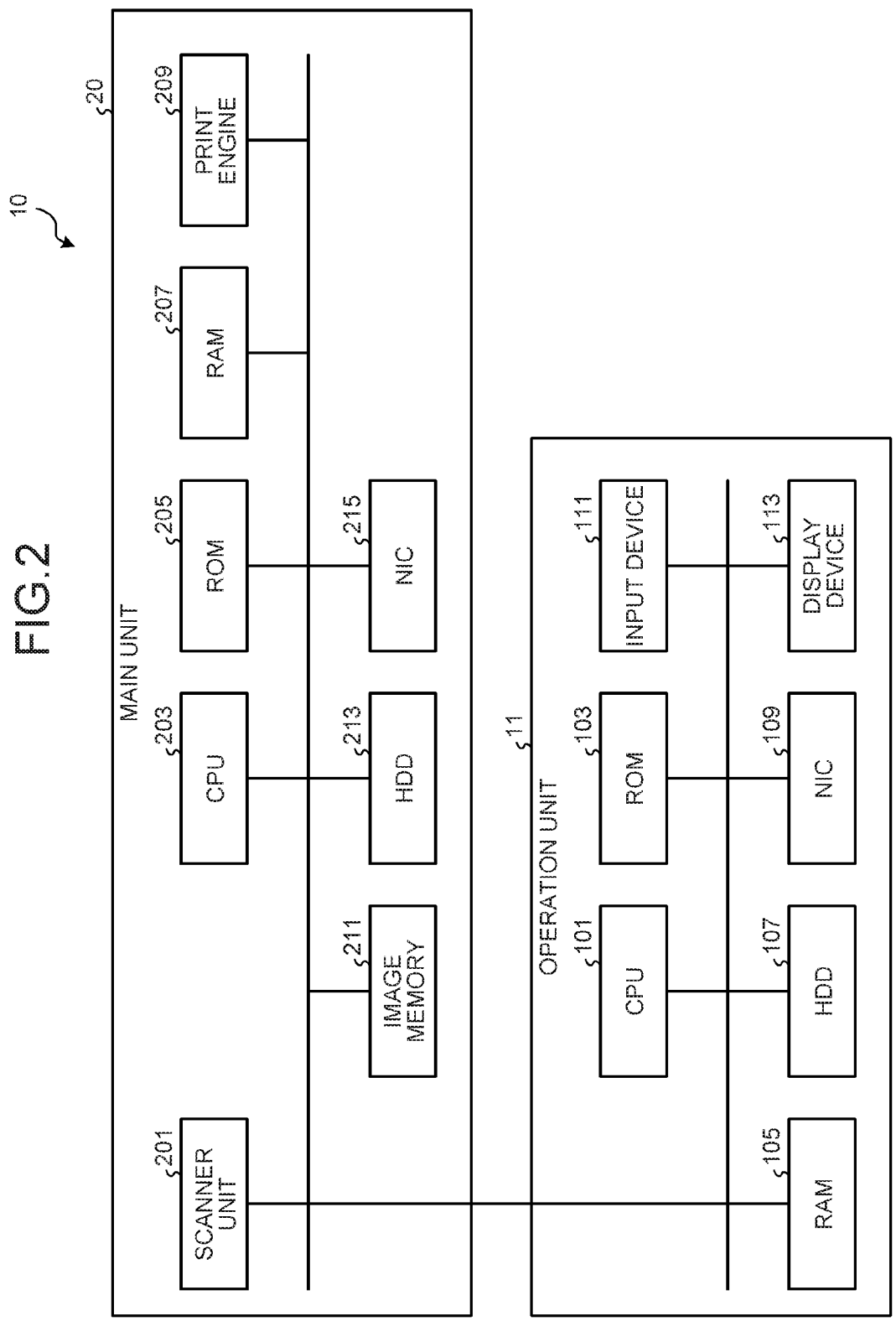
FIG. 2 is a block diagram illustrating an exemplary hardware configuration of a child device according to the embodiment.

FIG. 2 is a block diagram illustrating an exemplary hardware configuration of the child device 10 according to the embodiment. As illustrated in FIG. 2, the child device 10 includes an operation unit 11 and a main unit 20. The operation unit 11 includes a central processing unit (CPU) 101, a read-only memory (ROM) 103, a random access memory (RAM) 105, a hard disk drive (HDD) 107, a network interface controller (NIC) 109, an input device 111, and a display device 113. The main unit 20 includes a scanner unit 201, a CPU 203, a ROM 205, a RAM 207, a print engine 209, an image memory 211, an HDD 213, and a NIC 215. The hardware configuration of the child device 10 illustrated in FIG. 2 is however merely an example, and the hardware configuration is not limited thereto.

The NIC 109 is a communication interface for establishing communications via the internal network 2. The input device 111 is a device such as a touch panel for performing various operation inputs. The display device 113 is a device such as a display for displaying various types of information.

The ROM 103 stores therein, for example, a computer program executed by the CPU 101. The RAM 105 is used as a working area for the CPU 101. The HDD 107 stores therein various types of data used by the CPU 101. The CPU 101 implements various operations by executing a computer program stored in the ROM 103 on the RAM 105.

The scanner unit 201 electronically scans an original placed on a platen, and generates image data. The print engine 209 prints the image data. The image memory 211 is a memory for storing the image data generated by the scanner unit 201, and the image data for printing to be output to the print engine 209. The NIC 215 is a communication interface for establishing communications via the internal network 2.

The ROM 205 stores therein, for example, a computer program executed by the CPU 203. The RAM 207 is used as a working area for the CPU 203. The HDD 213 stores therein various types of data used by the CPU 203. The CPU 203 controls the scanner unit 201, the print engine 209, the image memory 211, the HDD 213, and the NIC 215 that are connected over a bus, by executing a computer program stored in the ROM 205 on the RAM 207.

Figure 3:
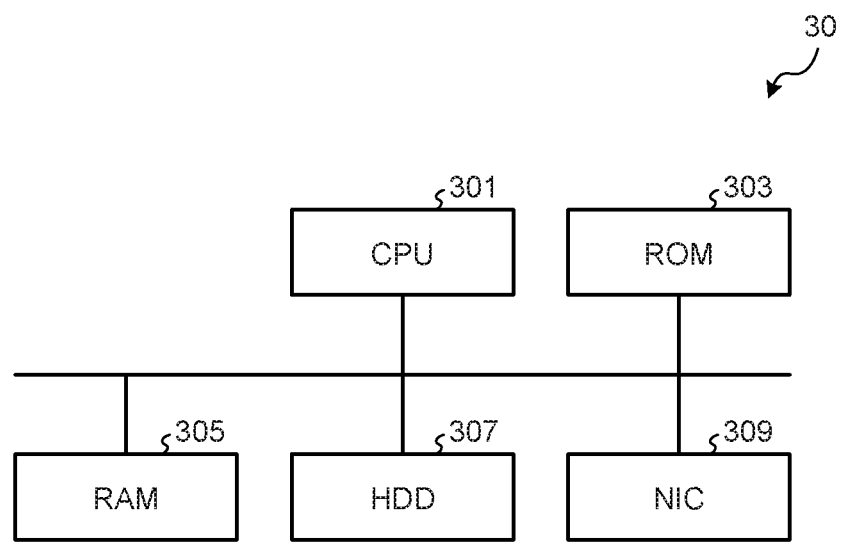
FIG. 3 is a block diagram illustrating an exemplary hardware configuration of a server device according to the embodiment.

FIG. 3 is a block diagram illustrating an exemplary hardware configuration of the server device 30 according to the embodiment. As illustrated in FIG. 3, the server device 30 includes a CPU 301, a ROM 303, a RAM 305, an HDD 307, and a NIC 309.

The NIC 309 is a communication interface for establishing communications via the internal network 2. The ROM 303 stores therein, for example, a computer program executed by the CPU 301. The RAM 305 is used as a working area for the CPU 301. The HDD 307 stores therein various types of data used by the CPU 301. The CPU 301 implements various operations by executing a computer program stored in the ROM 303 on the RAM 305.

Figure 4:
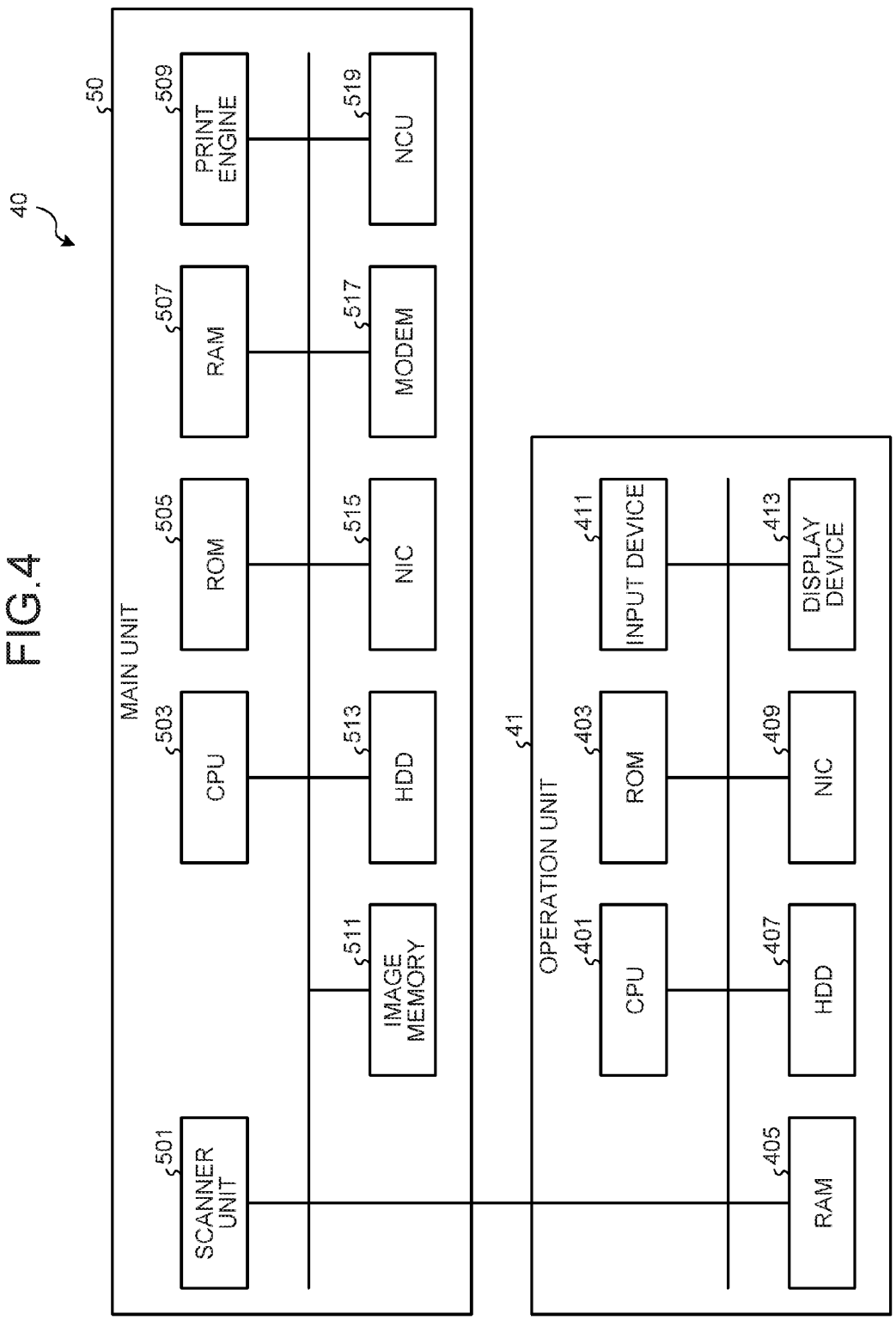
FIG. 4 is a block diagram illustrating an exemplary hardware configuration of a parent device according to the embodiment.

FIG. 4 is a block diagram illustrating an exemplary hardware configuration of the parent device 40 according to the embodiment. As illustrated in FIG. 4, the parent device 40 includes an operation unit 41 and a main unit 50. The operation unit 41 includes a CPU 401, a ROM 403, a RAM 405, an HDD 407, a NIC 409, an input device 411, and a display device 413. The main unit 50 includes a scanner unit 501, a CPU 503, a ROM 505, a RAM 507, a print engine 509, an image memory 511, an HDD 513, a NIC 515, a modulator-demodulator (MODEM) 517, and a network control unit (NCU) 519. The hardware configuration of the parent device 40 illustrated in FIG. 4 is however merely an example, and the hardware configuration is not limited thereto.

The NIC 409 is a communication interface for establishing communications via the internal network 2. The input device 411 is a device such as a touch panel for performing various operation inputs. The display device 413 is a device such as a display for displaying various types of information.

The ROM 403 stores therein, for example, a computer program executed by the CPU 401. The RAM 405 is used as a working area for the CPU 401. The HDD 407 stores therein various types of data used by the CPU 401. The CPU 401 implements various operations by executing a computer program stored in the ROM 403 on the RAM 405.

The scanner unit 501 electronically scans an original placed on the platen, and generates image data. The print engine 509 prints the image data. The image memory 511 is a memory for storing the image data generated by the scanner unit 501 and the image data for printing to be output to the print engine 509.

The NIC 515 is a communication interface for establishing communications via the internal network 2. The NCU 519 is a communication interface for establishing communications via the external network 3. The MODEM 517 is a device for modulating and demodulating data for facsimile communication over the external network 3.

The ROM 505 stores therein, for example, a computer program executed by the CPU 503. The RAM 507 is used as a working area for the CPU 503. The HDD 513 stores therein various types of data used by the CPU 503. The CPU 503 controls the scanner unit 501, the print engine 509, the image memory 511, the HDD 513, the NIC 515, the MODEM 517, and the NCU 519 that are connected over a bus, by executing a computer program stored in the ROM 505 on the RAM 507.

Figure 5:
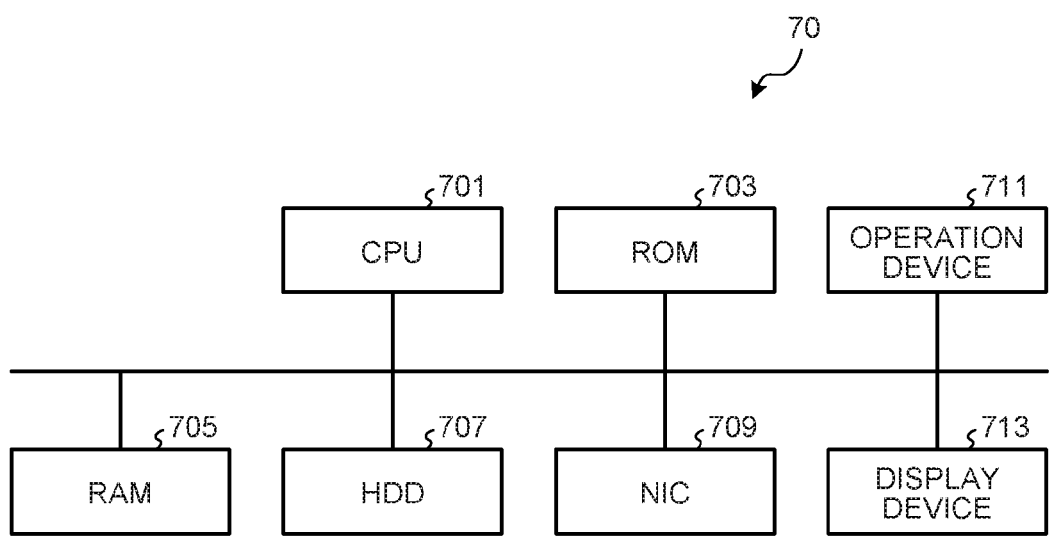
FIG. 5 is a block diagram illustrating an exemplary hardware configuration of a terminal device according to the embodiment.

FIG. 5 is a block diagram illustrating an exemplary hardware configuration of the terminal device 70 according to the embodiment. As illustrated in FIG. 5, the terminal device 70 includes a CPU 701, a ROM 703, a RAM 705, an HDD 707, a NIC 709, an operation device 711, and a display device 713. The hardware configuration of the terminal device 70 illustrated in FIG. 5 is however merely an example, and the hardware configuration is not limited thereto.

The NIC 709 is a communication interface for establishing communications via the internal network 2. The operation device 711 is a device such as a touch panel for performing various operation inputs. The display device 713 is a device such as a display for displaying various types of information.

The ROM 703 stores therein, for example, a computer program executed by the CPU 701. The RAM 705 is used as a working area for the CPU 701. The HDD 707 stores therein various types of data used by the CPU 701. The CPU 701 implements various operations by executing a computer program stored in the ROM 703 on the RAM 705.

Figure 6:
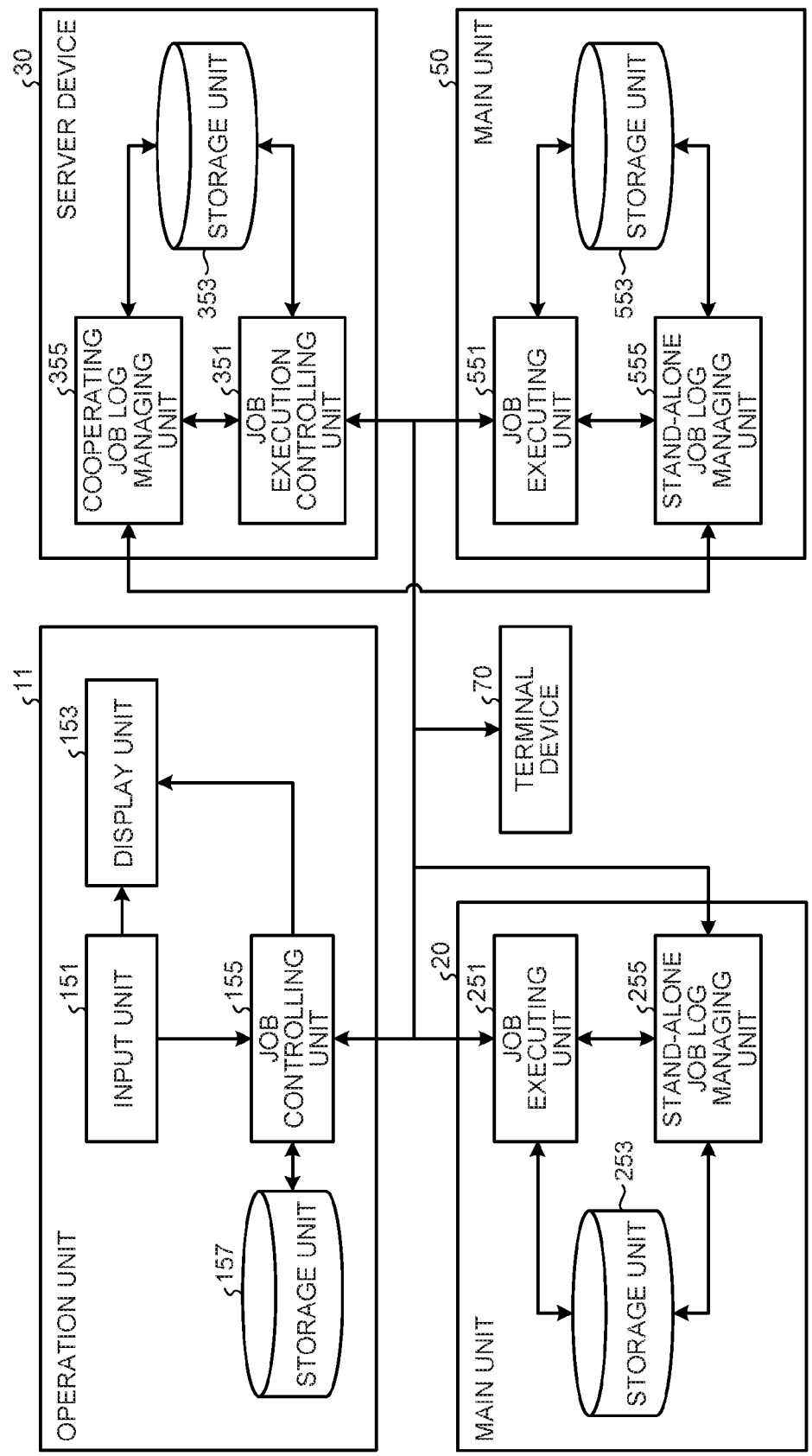
FIG. 6 is a block diagram illustrating an exemplary functional configuration of the cooperative system according to the embodiment.

FIG. 6 is a block diagram illustrating an exemplary functional configuration of the cooperative system 1 according to the embodiment. As illustrated in FIG. 6, the operation unit 11 includes an input unit 151, a display unit 153, a job controlling unit 155, and a storage unit 157. The job controlling unit 155 causes the main unit 20 to execute a stand-alone job, and causes the main unit 20 and the server device 30 to execute a cooperating job including a plurality of stand-alone jobs.

The input unit 151 can be implemented with the input device 111, for example. The display unit 153 can be implemented with the display device 113, for example. The job controlling unit 155 can be implemented with, for example, the CPU 101, the RAM 105, and the NIC 109. The storage unit 157 can be implemented with, for example, the HDD 107.

As illustrated in FIG. 6, the main unit 20 includes a job executing unit 251, a storage unit 253, and a stand-alone job log managing unit 255. Every time execution of a stand-alone job is requested by at least one of the operation unit 11 and the server device 30, the job executing unit 251 executes the stand-alone job. The stand-alone job log managing unit 255 generates and manages, for each of the executed stand-alone jobs, a stand-alone job log that is a log of the stand-alone job, and including a piece of stand-alone job log identification information for identifying the log.

The job executing unit 251 can be implemented with, for example, the scanner unit 201, the CPU 203, the RAM 207, the print engine 209, the image memory 211, and the NIC 215. The storage unit 253 can be implemented with, for example, the HDD 213. The stand-alone job log managing unit 255 can be implemented with, for example, the CPU 203, the RAM 207, and the NIC 215.

As illustrated in FIG. 6, the server device 30 includes a job execution controlling unit 351, a cooperating job log managing unit 355, and a storage unit 353. The job execution controlling unit 351 controls execution of stand-alone jobs included in a cooperating job, based on a cooperating job execution request received from the operation unit 11 or the operation unit 41. Specifically, the job execution controlling unit 351 issues requests for executing stand-alone jobs to one or more of the main units according to the stand-alone jobs included in the cooperating job.

The cooperating job log managing unit 355 manages a piece of cooperating job identification information for identifying a cooperating job in an association manner with the pieces of stand-alone job log identification information respectively corresponding to a plurality of stand-alone jobs included in the cooperating job. The cooperating job log managing unit 355 then acquires a plurality of stand-alone job logs from the main unit 20 and the main unit 50, and extracts the stand-alone job logs including the pieces of stand-alone job log identification information that are associated with the corresponding cooperating job identification information, so as to generate a cooperating job log that is a log of the cooperating job.

The job execution controlling unit 351 and the cooperating job log managing unit 355 can be implemented with the CPU 301, the RAM 305, and the NIC 309, for example. The storage unit 353 can be implemented with the HDD 307, for example.

Also as illustrated in FIG. 6, the main unit 50 includes a job executing unit 551, a storage unit 553, and a stand-alone job log managing unit 555. Every time execution of a stand-alone job is requested by at least one of the operation unit 41 and the server device 30, the job executing unit 551 executes the stand-alone job. The job log managing unit 555 generates and manages, for each of the stand-alone jobs executed by job executing unit 551, a stand-alone job log that is a log of the stand-alone job, and including a piece of stand-alone job log identification information for identifying the log.

The job executing unit 551 can be implemented with the scanner unit 501, the CPU 503, the RAM 507, the print engine 509, the image memory 511, the NIC 515, the MODEM 517, and the NCU 519, for example. The storage unit 553 can be implemented with the HDD 513, for example. The stand-alone job log managing unit 555 can be implemented with the CPU 503, the RAM 507, and the NIC 515, for example.

Explained below is an example in which a piece of image data generated by the child device 10 is transferred to the parent device 40 via the server device 30, and the parent device 40 transmits a FAX of the image data to the external facsimile device 60. The embodiment is, however, not limited to such an example. Also explained below is an example in which a stand-alone job log ID is used as the stand-alone job log identification information, and a cooperating job log ID is used as the cooperating job identification information. The embodiment is, however, not limited to such an example.

Figure 7:
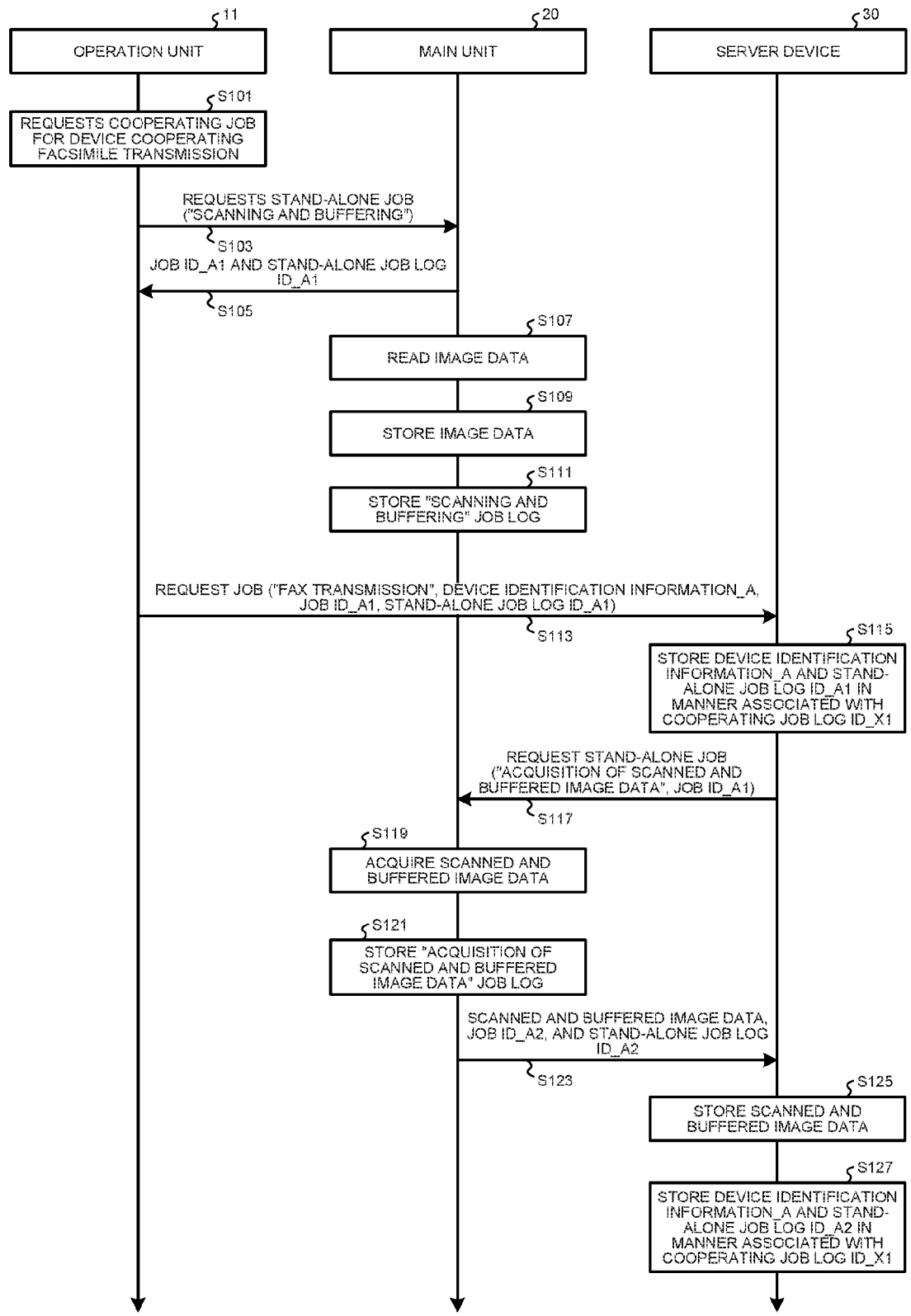
FIG. 7 is a sequence chart illustrating an exemplary operation of transferring a piece of image data generated by the child device to the server device according to the embodiment.

First, an operation of transferring the image data generated by the child device 10 to the server device 30 will be explained. FIG. 7 is a sequence chart illustrating an exemplary operation of transferring image data generated by the child device 10 to the server device 30 according to the embodiment.

To begin with, the input unit 151 in the operation unit 11 receives an input of a receiver designation of facsimile transmission and a condition for scanning the original, via a menu screen displayed on the display unit 153, and requests a cooperating job for device cooperating facsimile transmission for the job controlling unit 155 (Step S101).

The job controlling unit 155 then determines, based on the cooperating job request for the device cooperating facsimile transmission received from the input unit 151, to control a stand-alone job request for causing the main unit 20 to scan the original and to buffer the image data, and a job request for causing the server device 30 to transmit a FAX of the scanned and buffered image data, consecutively. The cooperating job for device cooperating facsimile transmission is made up from a stand-alone job of "scanning and buffering", and a job of "FAX transmission of scanned and buffered image data". The job of "FAX transmission of scanned and buffered image data", too, is made up from a plurality of stand-alone jobs.

The job controlling unit 155 first requests a stand-alone job ("scanning and buffering") for the main unit 20 (Step S103).

When the stand-alone job request ("scanning and buffering") is received, the job executing unit 251 in the main unit 20 issues a job ID_A1 for identifying the stand-alone job of "scanning and buffering", and a stand-alone job log ID_A1 for identifying the log of the stand-alone job of "scanning and buffering", and notifies the operation unit 11 of these pieces of identification information (Step S105).

The job executing unit 251 then reads a piece of image data from the original to be faxed (Step S107), and stores the scanned image data in the storage unit 253 (Step S109).

The stand-alone job log managing unit 255 then generates a job log of "scanning and buffering" that is the log of the stand-alone job of "scanning and buffering", and stores the log in the storage unit 253 (Step S111).

When the job ID_A1 and the stand-alone job log ID_A1 are notified, the job controlling unit 155 in the operation unit 11 acquires the internet protocol (IP) address of the server device 30 from the storage unit 157, and requests a job ("FAX transmission", the device identification information_A, the job ID_A1, the stand-alone job log ID_A1) for the server device 30 based on the acquired IP address (Step S113).

The device identification information_A is the identification of the main unit 20 having scanned the original and buffered the image data, and an example of the device ID is an IP address. The device identification information_A is explained to be stored in the storage unit 157 in advance, but the embodiment is not limited to such an example.

When the job request ("FAX transmission", the device identification information_A, the job ID_A1, the stand-alone job log ID_A1) is received, the job execution controlling unit 351 in the server device 30 issues a cooperating job log ID_X1 for identifying the log of a cooperating job for device cooperating facsimile transmission, and the cooperating job log managing unit 355 stores the cooperating job log ID_X1 in the storage unit 353, in a manner associated with the device identification information_A and the stand-alone job log ID_A1 (Step S115).

The job execution controlling unit 351 then requests a stand-alone job ("acquisition of scanned and buffered image data", the job ID_A1) for the main unit 20, based on the device identification information_A (Step S117).

When the stand-alone job request ("acquisition of scanned and buffered image data", the job ID_A1) is received, the job executing unit 251 in the main unit 20 issues a job ID_A2 for identifying the stand-alone job of "acquisition of scanned and buffered image data", and a stand-alone job log ID_A2 for identifying the log of the stand-alone job of "acquisition of scanned and buffered image data", and acquires the scanned and buffered image data, which is the image data having been stored in the storage unit 253 as a result of the stand-alone job of "scanning and buffering" identified by the job ID_A1, from the storage unit 253 (Step S119).

The stand-alone job log managing unit 255 then generates a job log of "acquisition of scanned and buffered image data" that is the log of the stand-alone job of "acquisition of scanned and buffered image data", and stores the log in storage unit 253 (Step S121).

The job executing unit 251 in the main unit 20 then notifies the server device 30 of the acquired scanned and buffered image data, the job ID_A2, and the stand-alone job log ID_A2 (Step S123).

The job execution controlling unit 351 in the server device 30 stores the notified scanned and buffered image data in the storage unit 353 (Step S125), and the cooperating job log managing unit 355 stores the device identification information_A and the notified stand-alone job log ID_A2 in the storage unit 353, in a manner associated with the cooperating job log ID_X1, which is also stored in the storage unit 353 (Step S127).

Up to this point in time, the job log of "scanning and buffering" and the job log "acquisition of buffered image data" are stored in the main unit 20. It is, however, not possible to determine whether each of these logs is a log of a stand-alone job included in a cooperating job, or a log of a stand-alone job that is completed internally within the main unit 20.

Figure 8:
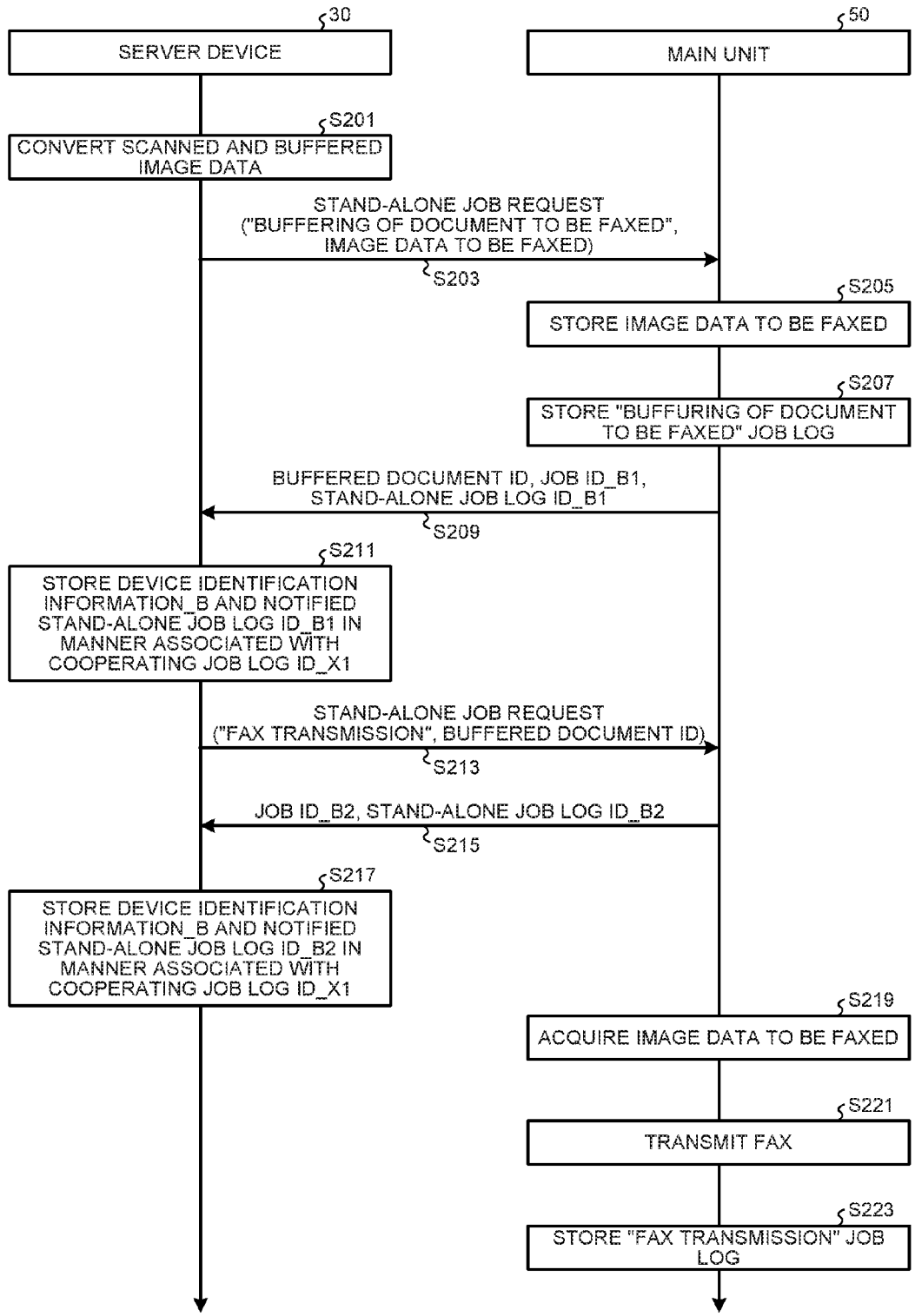
FIG. 8 is a sequence chart illustrating an exemplary operation of transferring the image data having been transferred to the server device to the parent device, and causing the parent device to transmit a facsimile (FAX) of the image to an external facsimile device.

An operation of transferring the image data having been transferred to the server device 30 to the parent device 40, and then transmitting a facsimile of the image data to the external facsimile device 60 will now be explained. FIG. 8 is a sequence chart subsequent to the sequence chart illustrated in FIG. 7, and is a sequence chart illustrating an exemplary operation of transferring the image data having been transferred to the server device 30 to the parent device 40, and then transmitting a facsimile of the image data to the external facsimile device 60.

To begin with, the job execution controlling unit 351 in the server device 30 reads the scanned and buffered image data from the storage unit 353, and converts the image data to image data to be faxed that is the FAX document for facsimile transmission (Step S201).

The job execution controlling unit 351 then acquires the device identification information_B of the parent device 40 (more specifically, the main unit 50) from the storage unit 353, and requests a stand-alone job ("buffering of document to be faxed", the image data to be faxed) from the main unit 50 based on the acquired device identification information_B (Step S203).

The device identification information_B is the identification of the main unit 50 transmitting facsimile, and an example of the device identification information includes an IP address. The device identification information_B is explained to be stored in the storage unit 353 in advance, the embodiment is, however, not limited to such an example.

When the stand-alone job request ("buffering of document to be faxed", the image data to be faxed) is received, the job executing unit 551 in the main unit 50 issues a job ID_B1 for identifying the stand-alone job of "buffering of document to be faxed", a stand-alone job log ID_B1 for identifying the log of the stand-alone job of "buffering of document to be faxed", and a buffered document ID for identifying the image data to be faxed, and stores the notified image data to be faxed in the storage unit 553 (Step S205).

The stand-alone job log managing unit 555 then generates the job log of "buffering of document to be faxed" that is the log of the stand-alone job of "buffering of document to be faxed", and stores the log in the storage unit 553 (Step S207).

The job executing unit 551 then notifies the server device 30 of the buffered document ID, the job ID_B1, and the stand-alone job log ID_B1 (Step S209).

The cooperating job log managing unit 355 in the server device 30 then stores the device identification information_B and the notified stand-alone job log ID_B1 in the storage unit 353, in a manner associated with the cooperating job log ID_X1 stored in the storage unit 353 (Step S211).

The job execution controlling unit 351 then requests a stand-alone job ("FAX transmission", the buffered document ID) from the main unit 50 (Step S213).

When the stand-alone job request ("FAX transmission", the buffered document ID) is received, the job executing unit 551 in the main unit 50 issues a job ID_B2 for identifying the stand-alone job of "FAX transmission", and a stand-alone job log ID_B2 for identifying the log of the stand-alone job of "FAX transmission", and notifies the server device 30 of these IDs (Step S215).

The cooperating job log managing unit 355 in the server device 30 then stores the device identification information_B and the notified stand-alone job log ID_B2 in the storage unit 353, in a manner associated with the cooperating job log ID_X1 stored in the storage unit 353 (Step S217).

The job executing unit 551 in the main unit 50 then acquires the image data to be faxed identified by the notified buffered document ID from the storage unit 553 (Step S219), and transmits a FAX of the image data to the external facsimile device 60 (Step S221).

The stand-alone job log managing unit 555 then generates a job log of "FAX transmission" that is a log of the stand-alone job of "FAX transmission", and stores the log in the storage unit 553 (Step S223).

Up to this point in time, the job log of "buffering of document to be faxed" and the job log of "FAX transmission" are stored in the main unit 50. It is, however, not possible to determine whether each of these logs is a log of a stand-alone job that is completed internally within the main unit 50, or a log of a stand-alone job included in a cooperating job.

Figure 9:
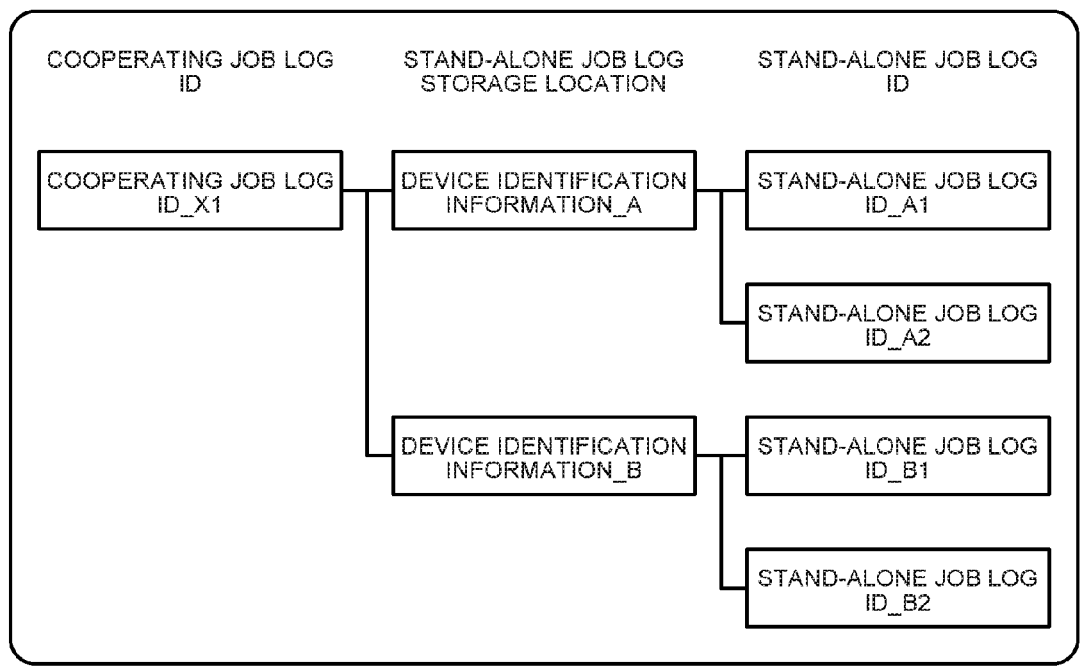
FIG. 9 is a schematic of an example of information related to logs managed by the server device according to the embodiment.
Figure 10:
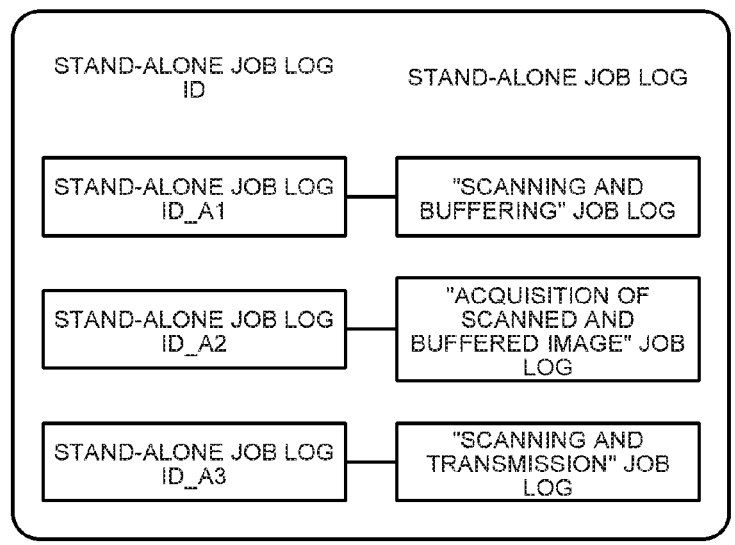
FIG. 10 is a schematic of an example of information related to logs managed by the main unit according to the embodiment.

FIG. 9 is a schematic illustrating an example of information related to the logs managed by the server device 30 according to the embodiment. FIG. 10 is a schematic illustrating an example of information related to the logs managed by the main unit 20 according to the embodiment. FIG. 11 is a schematic of an example of information related to the logs managed by the main unit 50 according to the embodiment. In the examples illustrated in FIGS. 9 to 11, it is assumed that a job of "scanning and transmission" is executed as a stand-alone job in the main unit 20, and a job of "copy" is executed as a stand-alone job in the main unit 50, separately from the device cooperating facsimile transmission, subsequently to the process explained with reference to the sequence charts FIGS. 7 and 8.

As illustrated in FIG. 9, the server device 30 stores therein the cooperating job log ID_X1 as a cooperating job log ID corresponding to the cooperating job for device cooperating facsimile transmission. The device identification information_A identifying the main unit 20 and the device identification information_B identifying the main unit 50 are then associated with the cooperating job log ID_X1. The stand-alone job log ID_A1 and the stand-alone job log ID_A2 are associated with the device identification information_A, and the stand-alone job log ID_B1 and stand-alone job log ID_B2 are associated with the device identification information_B.

As illustrated in FIG. 10, the main unit 20 stores therein the stand-alone job logs, each of which includes a stand-alone job log ID. Specifically, the main unit 20 stores therein the job log of "scanning and buffering" including the stand-alone job log ID_A1, the job log of "acquisition of buffered image data" including the stand-alone job log ID_A2, and the job log of "scanning and transmission" including the stand-alone job log ID_A3. As described earlier, the job log of "scanning and transmission" having the stand-alone job log ID_A3 is the log of a stand-alone job that is not related to the device cooperating facsimile transmission.

As illustrated in FIG. 11, the main unit 50 stores therein the stand-alone job logs each of which includes a stand-alone job log ID. Specifically, the main unit 50 stores therein the job log of "buffering of document to be faxed" including the stand-alone job log ID_B1, the job log of "transmit a FAX" including the stand-alone job log ID_B2, and the job log of "copy" including the stand-alone job log ID_B3. As described earlier, the job log of "copy" having the stand-alone job log ID_B3 is a log for a stand-alone job that is not related to the device cooperating facsimile transmission.

FIG. 12 is a schematic generally illustrating the logs of stand-alone jobs included in the cooperating job for device cooperating facsimile transmission according to the embodiment.

The "log location" represents a device where the corresponding log is stored. The "log type" represents a classification of the log. The "source" represents the source from which the data for the job is received, and the "destination" represents the destination to which the data corresponding to the job is output.

The first row represents the stand-alone job log identified by the job log ID_A1, and has a log type of "scanning and buffering". The "source" specifies "scanner", because an original printed on paper is scanned, and the "destination" specifies "buffer memory" because the scanned original is stored in the buffer memory.

The second row represents the stand-alone job log identified by the job log ID_A2, and has a log type of "acquisition of scanned and buffered image". The "source" specifies "buffer memory" because acquired is the buffered image having been already buffered, and the "destination" specifies "network" because the data is sent out to the server device 30 via the network.

The third row represents the stand-alone job log identified by the job log ID_B1, and has a log type of "buffering of document to be faxed". The "source" specifies "network", and the "destination" specifies "buffer memory", because the image data to be faxed, which is located at the server device 30, is buffered to the buffer memory in the main unit 50 via the network.

The fourth row represents the stand-alone job log identified by the job log ID_B2, and has a log type of "FAX transmission". The "source" specifies "buffer memory", and the "destination" specifies "network" because transmitted is the image data to be faxed having already been buffered.

Because the main unit 20 identified by the device identification information_A only stores therein the logs of scanning the original, buffering the image data, and having the image data accessed over the network, as described above, it is not possible to determine whether the job is a stand-alone job completed internally within the main unit 10, or is a part of a device cooperating job, based on these logs. In the same manner, because the main unit 50 identified by the device identification information_B only stores therein a log of transmitting a facsimile of the electrical file received over the network, it is not possible to determine whether the job is a stand-alone job completed internally within the main unit 50, or is a part of a device cooperating job, based on the log.

FIG. 13 is a schematic illustrating the exemplary job log of "scanning and buffering" illustrated in FIG. 12 in detail.

Items being the information recorded in a log can be classified into those that are commonly recorded for all log types, and those that are recorded depending on the source or the destination even among the logs with the same log type.

Recorded as the common items in the scanning and buffering are a job log ID, a job start/end time, a job operation source, and a user name. Recorded in a case where a source is "scanner" are items such as scanning status/result, the number of original surfaces scanned, designation of a color mode, designation of an original type, and designation of a resolution. Recorded in a case where a destination is "buffer memory" are items such as buffering status/result, the number of sheets buffered, a buffered document name, and a document ID.

These items are listed herein as examples, but the job log may record any other items that are related to the jobs.

FIG. 14 is a schematic illustrating the exemplary job log of "acquisition of scanned and buffered image" illustrated in FIG. 12 in detail. Although the pieces of information specified in the items are different from those illustrated in FIG. 13, with a source "buffer memory" and a destination "network", because these items themselves are the same as those described in FIG. 13, the explanation of this job log is omitted herein.

FIG. 15 is a schematic illustrating the exemplary job log of "buffer document to be faxed" illustrated in FIG. 12 in detail. Although the pieces of information specified in the items are different from those illustrated in FIG. 13 with a source "network" and a destination "buffer memory", because these items themselves are the same as those described in FIG. 13, the explanation of this job log is omitted herein.

FIG. 16 is a schematic illustrating the exemplary job log of "FAX transmission" illustrated in FIG. 12 in detail. Although the pieces of information specified in the items are different from those illustrated in FIG. 13, with a source "buffer memory" and a destination "network", because these items themselves are the same as those described in FIG. 13, the explanation of this job log is omitted herein.

An operation of generating the cooperating job log for a cooperating job for device cooperating facsimile transmission will now be explained. As mentioned earlier, with the information managed in the main units alone, it is not possible to distinguish between a log for a stand-alone job that is completed internally within the main unit, and a log of a stand-alone job included in a cooperating job. Therefore, in the embodiment, the server device 30 generates a cooperating job log for a cooperating job by acquiring the stand-alone job logs from the main units, and merging the acquired logs.

Figure 17:
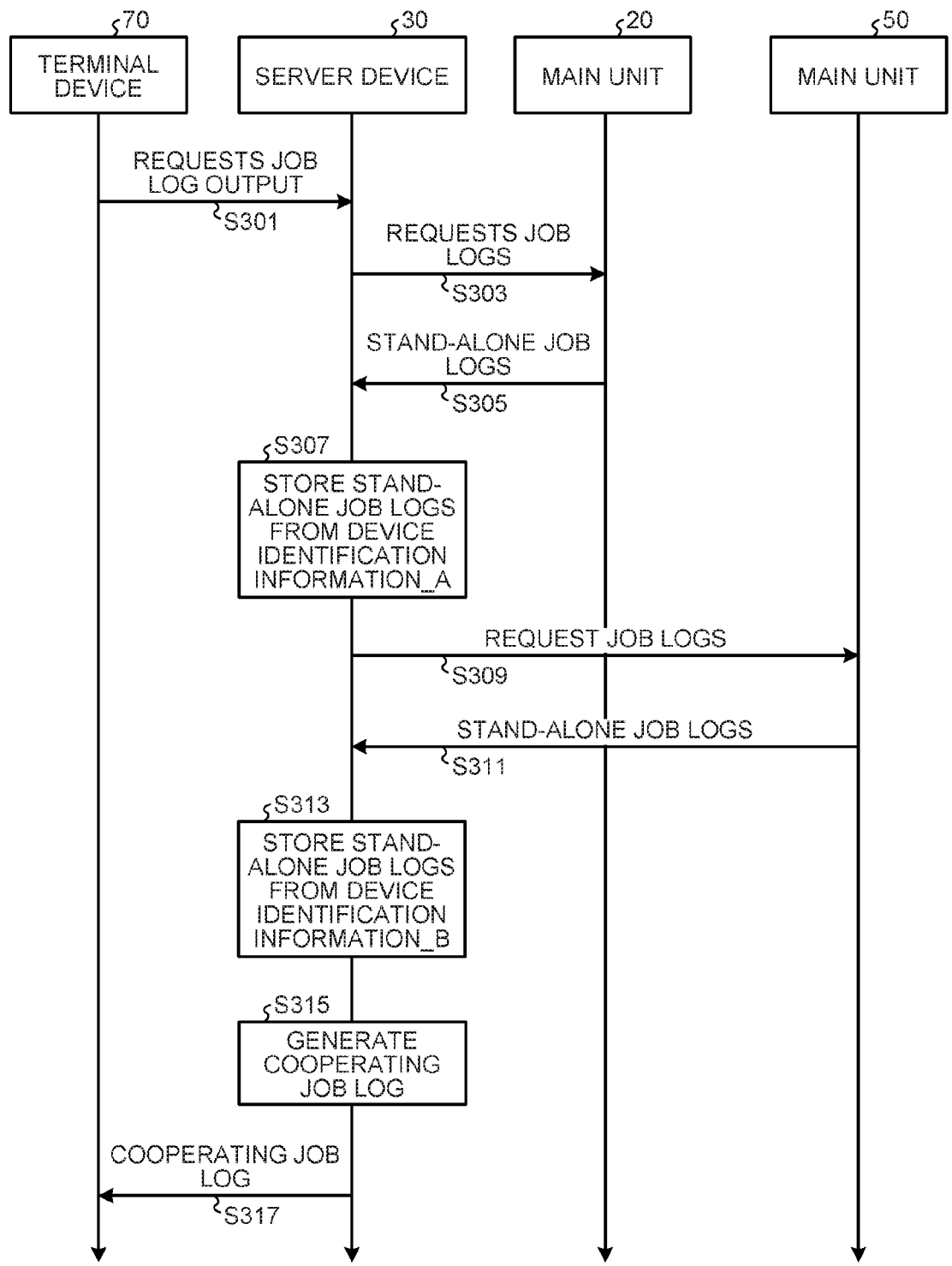
FIG. 17 is a sequence chart illustrating an exemplary operation of generating a cooperating job log corresponding to a cooperating job for device cooperating facsimile transmission in the embodiment.

FIG. 17 is a sequence chart illustrating an exemplary operation of generating a cooperating job log for a cooperating job for device cooperating facsimile transmission in the embodiment.

To begin with, a user requests an output of the cooperating job log for the server device 30 using the terminal device 70, for example (Step S301). The cooperating job log managing unit 355 in the server device 30 provides the user with a Web-based user interface (UI), for example, and the user requests the output of the job log by making an operation on the Web-based UI displayed in the browser on the terminal device 70.

When the job log output request is received, the cooperating job log managing unit 355 acquires the device identification information of the devices operating cooperatively with the server device 30 from the storage unit 353. In this example, it is assumed that the cooperating job log managing unit 355 acquires the device identification information_A and the device identification information_B.

The cooperating job log managing unit 355 then requests job logs for the main unit 20, based on the device identification information_A (Step S303). In response to this, the stand-alone job log managing unit 255 in the main unit 20 acquires the stand-alone job logs (see FIG. 10) from the storage unit 253, and notifies the server device 30 of the job logs (Step S305). The cooperating job log managing unit 355 then stores the stand-alone job logs notified from the main unit 20 in the storage unit 353 (Step S307).

The cooperating job log managing unit 355 then requests job logs for the main unit 50 based on the device identification information_B (Step S309). In response to this, the stand-alone job log managing unit 555 in the main unit 50 acquires the stand-alone job logs (see FIG. 11) from the storage unit 553, and notifies the server device 30 of the job logs (Step S311). The cooperating job log managing unit 355 then stores the stand-alone job logs notified from the main unit 50 in the storage unit 353 (Step S313).

The processes at Steps S303 to S307 may be performed in parallel with the processes at Steps S309 to S313, or these processes may be performed in the reversed order.

The cooperating job log managing unit 355 generates a cooperating job log by extracting stand-alone job logs including the stand-alone job log IDs that are associated with the cooperating job log ID from the acquired stand-alone job logs (Step S315), and notifies the terminal device 70 of the cooperating job log (Step S317).

Figure 18:
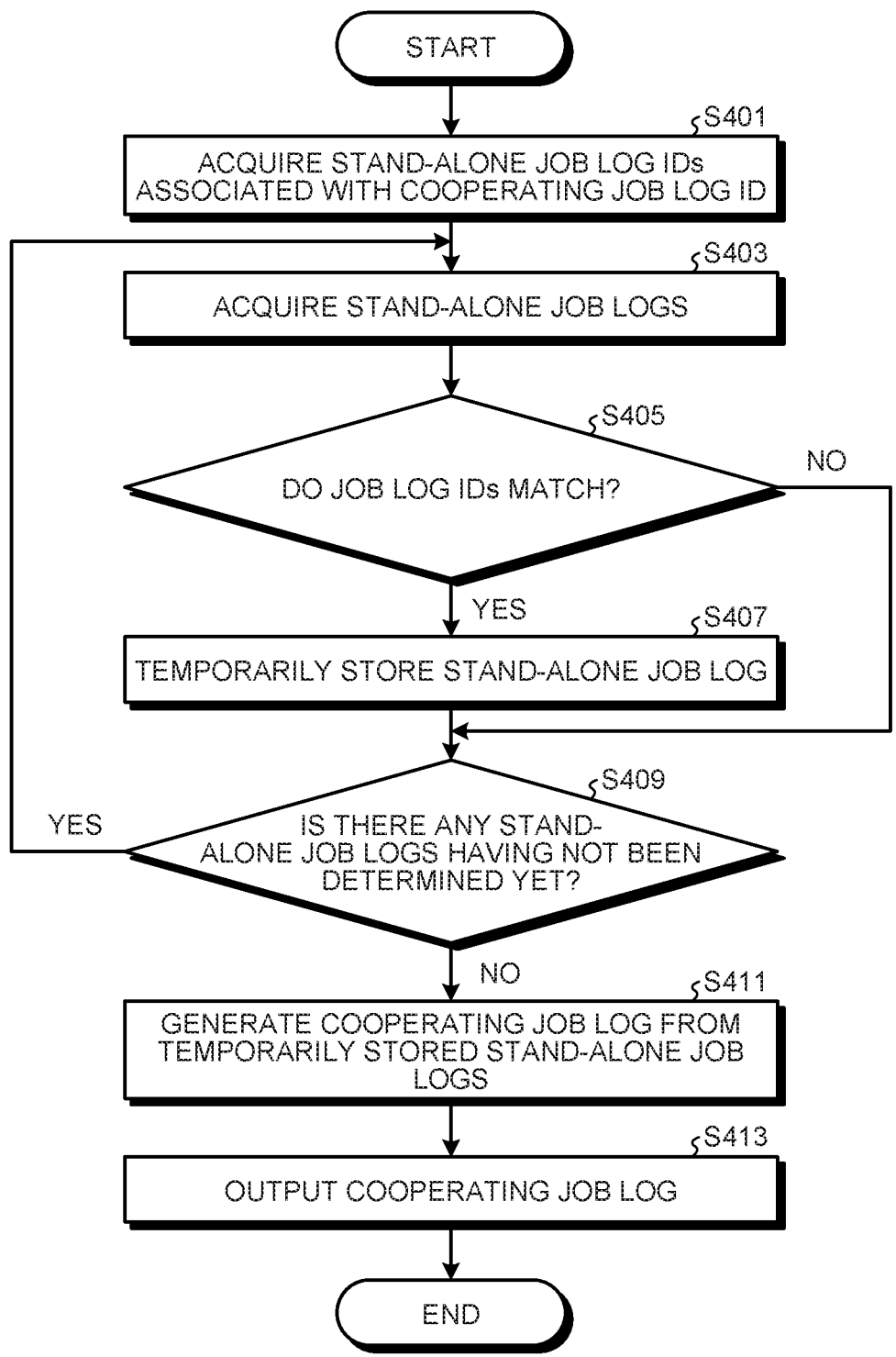
FIG. 18 is a flowchart illustrating a specific example of processes of generating the cooperating job log according to the embodiment.

FIG. 18 is a flowchart illustrating a specific example of the processes of generating the cooperating job log according to the embodiment.

To begin with, the cooperating job log managing unit 355 acquires the stand-alone job log IDs (see FIG. 9) associated with the cooperating job log ID from the storage unit 353 (Step S401). As a result, the cooperating job log managing unit 355 acquires the stand-alone job log ID_A1, the stand-alone job log ID_A2, the stand-alone job log ID_B1, and the stand-alone job log ID_B2 that are associated with the cooperating job log ID_X1.

The cooperating job log managing unit 355 then acquires the stand-alone job logs acquired from the main unit 10 and the main unit 50 (Step S403), and determines whether the stand-alone job log ID specified in each of these stand-alone job logs matches any one of the stand-alone job log IDs associated with the cooperating job log ID (Step S405).

If the job log IDs match (Yes at Step S405), the cooperating job log managing unit 355 temporarily stores the stand-alone job log (Step S407).

The cooperating job log managing unit 355 repeats the processes from Steps S403 to S409 until the determination is made for all of the stand-alone job logs acquired from the main unit 10 and the main unit 50 (Yes at Step S409). As a result, the stand-alone job logs including some of the stand-alone job log ID_A1, the stand-alone job log ID_A2, the stand-alone job log ID_B1, and the stand-alone job log ID_B2 are temporarily stored.

Once the determination is completed for all of the stand-alone job logs acquired from the main unit 10 and the main unit 50 (Yes at Step S409), the cooperating job log managing unit 355 generates a cooperating job log by concatenating the temporarily stored stand-alone job logs (Step S411), and outputs the cooperating job log (Step S413). As a result, the cooperating job log will be the concatenation of the stand-alone job logs including some of the stand-alone job log ID_A1, the stand-alone job log ID_A2, the stand-alone job log ID_B1, and the stand-alone job log ID_B2.

The cooperating job log managing unit 355 may output, in addition to the cooperating job log, a stand-alone job log with a stand-alone job log ID having not matched with the stand-alone job log ID of the cooperating job log ID at Step S405, as a stand-alone job log of a job having been completed internally within that corresponding main unit.

Figure 19:
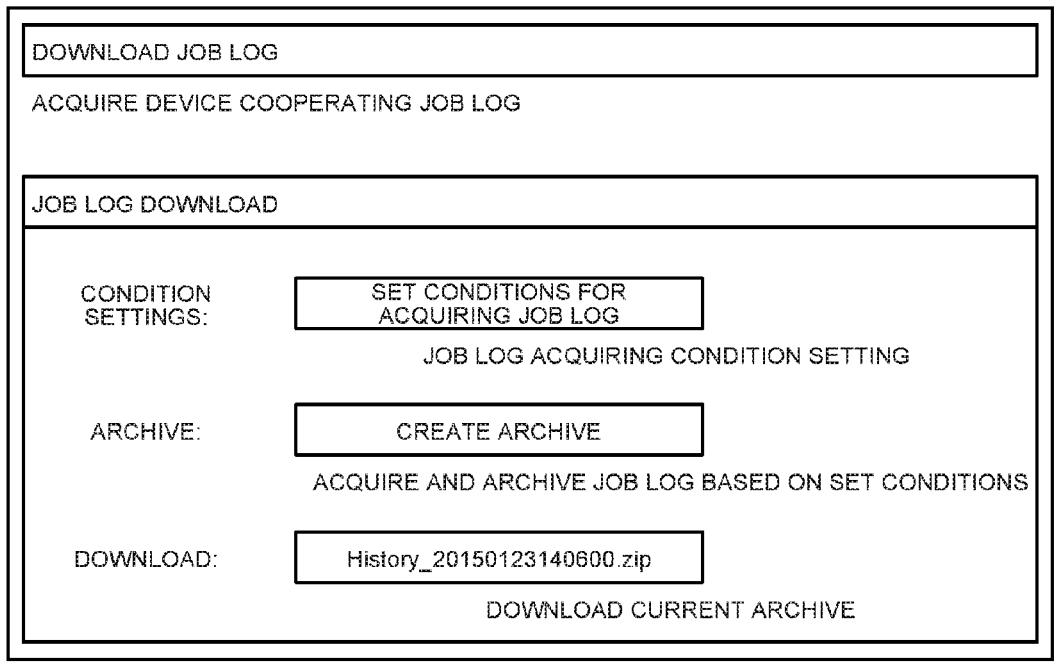
FIG. 19 is a schematic of an exemplary Web-based user interface (UI) for requesting an output of a job log in the embodiment.

FIG. 19 is a schematic of an exemplary Web-based UI for requesting an output of a job log in the embodiment. The exemplary Web-based UI illustrated in FIG. 19 enables a user to specify some conditions so that a cooperating job log having been processed in different patterns can be provided. In other words, the cooperating job log can be customized based on the request for the output of the cooperating job log.

Specifically, a user specifies conditions on the screen displayed in response to a pressing operation on a "Job Log Acquiring Condition Settings" button, and presses a "Create Archive" button. In response, the cooperating job log managing unit 355 processes the cooperating job log based on the specified conditions, and performs an archiving process. Once the job log is archived, the name of the archived file (e.g., History_20150123140600.zip) is displayed on the "Download" button. The user can then download the cooperating job log by pressing the button.

Figure 20:
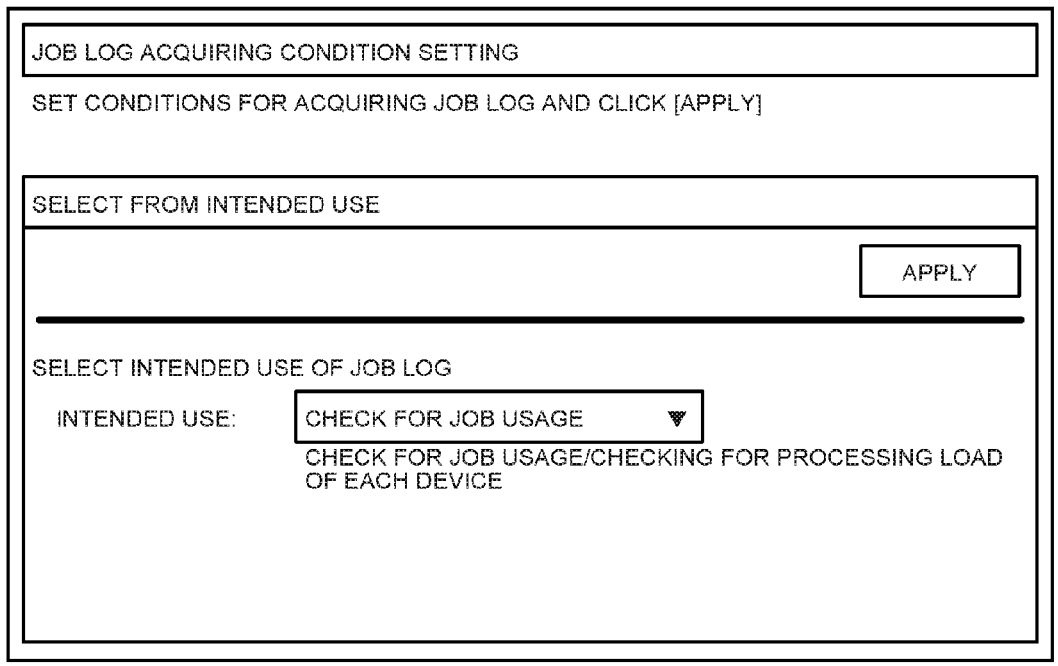
FIG. 20 is a schematic for explaining a specific example of a job log acquisition condition setting according to the embodiment.

FIG. 20 is a schematic for explaining a specific example of a job log acquisition condition setting according to the embodiment. The example illustrated in FIG. 20 provides an example in which the pattern for processing the job log is determined automatically by causing a user to select his/her intended use of the job log in the "Job Log Acquiring Condition Settings" screen. When the user selects the intended use, a piece of intended use information indicating the selected intended use becomes included in the request for the cooperating job log output, and the cooperating job log managing unit 355 is caused to generate a cooperating job log suitable for the intended use indicated by the intended use information. In this example, a user can select either "Check for Job Usage" or "Checking for Processing Load of Each Device" as the intended use.

When "Check for Job Usage" is selected, it is quite likely that the user wants to know what is specified in a job, or the number of times the job has been executed, for each of the jobs having been executed, but is less likely that the user is interested in how the stand-alone jobs are combined internally by the system to implement a cooperating jobs. Therefore, the cooperating job log managing unit 355 generates the cooperating job log using only the stand-alone job logs corresponding to inputs to and outputs from the entire cooperative system 1.

Because relevant to the cooperating job for device cooperating facsimile transmission are only the stand-alone job logs specified in the first row ("scanning and buffering") and the fourth row ("FAX transmission") in FIG. 12, the cooperating job log managing unit 355 will generate a cooperating job log by processing these two stand-alone job logs. Therefore, the user can understand that the job of scanning a paper original and transmitting a facsimile is executed one time, but the user will not require the information indicating that the four stand-alone jobs have been executed internally.

When "Checking for Processing Load of Each Device" is selected, it is quite likely that the user wants to know the information as to what types of jobs have been executed at which timing on each of the devices, including the information as to how the system has performed what kind of process internally. Therefore, the cooperating job log managing unit 355 generates the cooperating job log using the stand-alone job logs sorted by each device on which the corresponding jobs are executed in the cooperative system 1.

For the cooperating job for device cooperating facsimile transmission, the cooperating job log managing unit 355 generates the cooperating job log by putting the stand-alone job logs in the first to the second rows illustrated in FIG. 12 into a package, and the stand-alone job logs in the third to the fourth rows into another package. Therefore, the user can collectively acquire the job logs of each device included in the cooperative system 1, and also the information indicating that those jobs are related to each other as a cooperating job, without merely listing the stand-alone jobs.

For the "Job Log Acquiring Condition Settings" screen, the cooperating job log managing unit 355 may output a screen presenting a structure tree of the stand-alone job logs for each job and may generate the cooperating job log including the stand-alone job logs selected from the structure tree. In such a case, the structure tree may be constructed for each job as illustrated in FIG. 21, or alternatively, constructed for each device as illustrated in FIG. 22. In FIGS. 21 and 22, the image forming apparatus A represents the main unit 20, and the image forming apparatus B represents the main unit 50.

If the structure tree is constructed for each job, the user can visually know the relations between the stand-alone job logs and the cooperating job log easily, so that the user can find the job log he/she needs more easily. By contrast, if the structure tree is constructed for each device, a user can visually recognize the job logs recorded in each of the devices more easily. Such a structure tree can also visualize the relation between the stand-alone job logs and the cooperating job log, the user can find the job log he/she needs more easily.

As described above, according to the embodiment, because the server device acquires the stand-alone job logs from each of the main units and merges the acquired stand-alone job logs, so as to generate a cooperating job log of a cooperating job. Therefore, even when a device having the independent operation unit and the independent main unit performs the cooperative operation, the jobs for the cooperative operation can be managed, advantageously.

Such a cooperating job log enables a user to determine whether a stand-alone job log stored in the main unit is a log of a stand-alone job completed internally within the main unit, or that of a stand-alone job included in a cooperating job.

First Modification

In the embodiment described above, the server device 30 may also be configured to execute a stand-alone job. In such a case, to cause a main unit to execute a stand-alone job included in a cooperating job, the job execution controlling unit 351 requests the execution of the stand-alone job for the main unit. To cause the server device 30 to execute a stand-alone job included in the cooperating job, the job execution controlling unit 351 executes the stand-alone job. The cooperating job log managing unit 355 then generates and manages the stand-alone job logs each of which includes a stand-alone job log ID, for each of the stand-alone jobs having been executed. The cooperating job log managing unit 355 may then generate the cooperating job log by acquiring the stand-alone job logs also from the server device 30.

Second Modification

In the embodiment described above, the cooperating job log managing unit 355 generates a cooperating job log in response to a request for an output of the job log, but the cooperating job log managing unit 355 may also generate a cooperating job log subsequently to the execution of the cooperating job. With such a configuration, because the cooperating job log is stored in the storage unit 353, an output of the cooperating job log can be provided off-line.

Third Modification

In the explanation of the embodiment described above, it is assumed that the operation unit 11 communicates directly with the server device 30 over the internal network 2, but the operation unit 11 may communicate with the server device 30 via the main unit 20 and the internal network 2.

Fourth Modification

In the embodiment described above, the operation unit 11 may be implemented as an application running on a smartphone or a tablet terminal.

Fifth Modification

In the embodiment described above, the server device 30 may be provided as an internal server, internalized in the child device 10 or the parent device 40, without providing as an independent server.

Computer Program

A computer program executed by each of the operation unit, the main unit, and the server device according to the embodiment and the modifications described above (hereinafter, referred to as "each of the devices according to the embodiment and the modifications") is provided stored in a computer-readable storage medium, such as a compact disc read-only memory (CD-ROM), a compact disc recordable (CD-R), a memory card, a digital versatile disc (DVD), or a flexible disk (FD), as a file in an installable or executable format.

The computer program executed by each of the devices according to the embodiment and the modifications may be stored in a computer that is connected to a network such as the Internet, and made available for download over the network. Furthermore, the computer program executed by each of the devices according to the embodiment and the modifications may be provided or distributed over a network such as the Internet. Furthermore, the computer program executed by each of the devices according to the embodiment and the modifications may be provided in a manner incorporated in a ROM or the like in advance.

The computer program executed by each of the devices according to the embodiment and the modification has a modular structure that implements each of the units described above on a computer. As an actual hardware configuration, for example, the functional units described above are implemented on the computer by causing a CPU to read the computer program from the ROM onto the RAM and to execute the computer program.

According to the present invention, jobs for a cooperative operation can be managed even when an apparatus with independent operation unit and main unit is involved in a cooperative operation, advantageously.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cooperative system comprising:
   at least one device that includes at least one first processor and at least one second processor, the at least one second processor configured to establish external communications; and
   an information processing apparatus including at least one third processor, wherein
   the at least one first processor is configured to cause the at least one second processor and the information processing apparatus to execute a cooperating job cooperatively, the cooperating job including a plurality of stand-alone jobs, and
   the at least one second processor is configured to execute at least one of the plurality of stand-alone jobs when at least one of the at least one first processor and the information processing apparatus requests execution of the one of the plurality of stand-alone jobs; and generate and manage a first stand-alone job log for each executed stand-alone job, the first stand-alone job log is a log of the respective stand-alone job and that includes stand-alone job log identification information for identifying the first stand-alone job log, the at least one third processor is configured to, store the first stand-alone job logs;

control execution of the plurality of stand-alone jobs included in the cooperating job, based on a request for executing the cooperating job from the at least one first processor;

manage cooperating job identification information for identifying the cooperating job in an association with the stand-alone job log identification information of the plurality of stand-alone jobs included in the cooperating job; and acquire second stand-alone job logs from the at least one second processor and extract the first stand-alone job logs including the stand-alone job log identification information associated with the cooperating job identification information to generate a cooperating job log that is a log of the cooperating job based on the acquired second stand-alone job logs and the extracted first stand-alone job logs, wherein the at least one third processor is configured to request the at least one second processor to execute at least one of the plurality of stand-alone jobs in the cooperating job and to request the information processing apparatus to execute at least another one of the plurality of stand-alone jobs in the cooperating job.

2. The cooperative system according to claim 1, wherein the at least one device includes a plurality of devices, and the at least one third processor is configured to request the at least one second processor to execute the plurality of stand-alone jobs according to the stand-alone jobs included in the cooperating job.

3. The cooperative system according to claim 1, wherein the at least one third processor is configured to generate and output the cooperating job log based on a cooperating job log output request.

4. The cooperative system according to claim 1, wherein the at least one third processor is configured to generate the cooperating job log subsequently to the execution of the cooperating job.

5. The cooperative system according to claim 1, wherein the at least one first processor and the information processing apparatus are connected over a network.

6. The cooperative system according to claim 1, wherein the at least one first processor and the at least one second processor are internally connected, and the at least one second processor and the information processing apparatus are connected over a network.

7. An information processing apparatus that is connected to at least one device over a network, the at least one device including at least one first processor and at least one second processor, the information processing apparatus comprising:

at least one third processor configured to, control execution of a cooperating job including a plurality of first stand-alone jobs based on a request for causing the at least one second processor and the information processing apparatus to execute the cooperating job, the request being received from the at least one first processor, the at least one third processor further configured to cause the at least one second processor to execute at least one of the plurality of first stand-alone jobs, manage cooperating job identification information for identifying the cooperating job in an association with first stand-alone job log identification information of the first stand-alone jobs included in the cooperating job, among second stand-alone job log identification information of respective first and second stand-alone job logs managed by the at least one second processor every time execution of one of the first stand-alone jobs is requested by at least one of the at least one first processor and the information processing apparatus, and acquire third stand-alone job logs from the at least one first processor and extract the first stand-alone job logs including the first stand-alone job log identification information associated with the cooperating job identification information to generate a cooperating job log that is a log of the cooperating job based on the acquired third stand-alone job logs and the extracted first stand-alone job logs, wherein the at least one third processor is configured to request the at least one second processor to execute at least one of the plurality of first stand-alone jobs in the cooperating job and to request the information processing apparatus to execute at least another one of the plurality of first stand-alone jobs in the cooperating job.

8. The information processing apparatus according to claim 7, wherein the at least one device includes a plurality of devices and the information processing apparatus is connected to the plurality of the devices over the network, and the at least one third processor is configured to request the at least one second processors to execute the first stand-alone jobs.

9. The information processing apparatus according to claim 7, wherein the at least one third processor is configured to generate and output the cooperating job log in response to a cooperating job log output request.

10. The information processing apparatus according to claim 9, wherein the cooperating job log is a log that is based on the cooperating job log output request.

11. The information processing apparatus according to claim 9, wherein the cooperating job log output request includes intended use information representing intended use of the cooperating job log, and the cooperating job log is a log that is based on intended use specified in the intended use information.

12. The information processing apparatus according to claim 11, wherein when the intended use information indicates checking for usage, the at least one third processor generate the cooperating job log using the first stand-alone job logs and the third stand-alone job logs.

13. The information processing apparatus according to claim 12, wherein when the intended use information indicates checking for processing load, the at least one third processor sorts the extracted first stand-alone job logs based on from where the first stand-alone job logs are extracted to generate the cooperating job log.

14. The information processing apparatus according to claim 9, wherein the at least one third processor is configured to output a structure screen presenting how the extracted first stand-alone job logs are structured, and generate the cooperating job log using first stand-alone job logs selected on the structure screen.

15. The information processing apparatus according to claim 14, wherein the structure screen is a screen presenting a structure tree of the extracted first stand-alone job logs.

16. The information processing apparatus according to claim 14, wherein the structure screen is a screen presenting a structure tree of the extracted first stand-alone job logs for each of the at least one device.

17. The information processing apparatus according to claim 7, wherein the at least one third processor is configured to generate the cooperating job log subsequently to the execution of the cooperating job.

18. A non-transitory computer-readable medium, when executed by a computer that is connected to a device including at least one first processor and at least one second processor, to execute:

control execution of a cooperating job including a plurality of first stand-alone jobs based on a request for causing the at least one second processor and an information processing apparatus to execute the cooperating job, the request being received from the at least one first processor;

manage cooperating job identification information for identifying the cooperating job in an association with first stand-alone job log identification information of the first stand-alone jobs included in the cooperating job, among second stand-alone job log identification information of respective first and second stand-alone job logs managed by the at least one second processor that executes one of the first stand-alone jobs every time execution of one of the first stand-alone jobs is requested by at least one of the at least one first processor and the information processing apparatus, and generates one of the first stand-alone job logs that is a log of the executed first stand-alone job and includes stand-alone job log identification information for identifying the log;

acquire third stand-alone job logs from the at least one second processor and extracting the first stand-alone job logs including the first stand-alone job log identification information associated with the cooperating job identification information to generate a cooperating job log that is a log of the cooperating job based on the acquired third stand-alone job logs and the extracted first stand-alone job logs; and request the at least one second processor to execute at least one of the plurality of first stand-alone jobs in the cooperating job and to request the information processing apparatus to execute at least another one of the plurality of first stand-alone jobs in the cooperating job.

* * * * *